US011899970B2

(12) United States Patent
Jeong et al.

(10) Patent No.: US 11,899,970 B2
(45) Date of Patent: Feb. 13, 2024

(54) STORAGE SYSTEM AND METHOD TO PERFORM WORKLOAD ASSOCIATED WITH A HOST

(71) Applicant: SAMSUNG ELECTRONICS CO., LTD., Suwon-si (KR)

(72) Inventors: Wonseb Jeong, Suwon-si (KR); Hee Hyun Nam, Seoul (KR); Younggeon Yoo, Seoul (KR); Jeongho Lee, Gwacheon-si (KR); Younho Jeon, Gimhae-si (KR); Ipoom Jeong, Hwaseong-si (KR); Chanho Yoon, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/742,184

(22) Filed: May 11, 2022

(65) Prior Publication Data
US 2023/0100573 A1 Mar. 30, 2023

(30) Foreign Application Priority Data

Sep. 29, 2021 (KR) .......................... 10-2021-0128940

(51) Int. Cl.
*G06F 3/06* (2006.01)
(52) U.S. Cl.
CPC .......... *G06F 3/0658* (2013.01); *G06F 3/0611* (2013.01); *G06F 3/0622* (2013.01); *G06F 3/0683* (2013.01)
(58) Field of Classification Search
CPC .... G06F 3/0658; G06F 3/0611; G06F 3/0622; G06F 3/0683; G06F 12/02; G06F 12/0207; G06F 12/0223
See application file for complete search history.

(56) References Cited

U.S. PATENT DOCUMENTS

| | | | |
|---|---|---|---|
| 9,600,413 B2 | 3/2017 | Ray et al. | |
| 10,296,230 B1* | 5/2019 | Balakrishnan | ........ G06F 3/0685 |
| 10,592,241 B2 | 3/2020 | Zhang et al. | |
| 10,929,503 B2 | 2/2021 | Azizi et al. | |
| 2005/0091454 A1* | 4/2005 | Shimada | ................. G06F 3/067 |
| | | | 711/173 |
| 2005/0257014 A1* | 11/2005 | Maki | ..................... G06F 3/0605 |
| | | | 711/170 |
| 2010/0107013 A1* | 4/2010 | Mopur | .................. H04L 41/147 |
| | | | 714/E11.178 |
| 2016/0018989 A1* | 1/2016 | Kiyota | .................. G06F 3/0631 |
| | | | 711/154 |

(Continued)

FOREIGN PATENT DOCUMENTS

KR   10-1888781 B1   8/2018

OTHER PUBLICATIONS

Chinese Office Action dated Nov. 18, 2022 Cited in Related Chinese Patent Application.

*Primary Examiner* — Khoa D Doan
(74) *Attorney, Agent, or Firm* — Fish & Richardson P.C.

(57) ABSTRACT

A memory device includes; a first memory of first type, a second memory of second type different from the first type, and a memory controller. The memory controller receives an access request and workload information related to work of an external processor, processes the access request using the workload information, and accesses at least one of the first memory and the second memory in response to the access request.

18 Claims, 14 Drawing Sheets

(56) References Cited

U.S. PATENT DOCUMENTS

| | | | |
|---|---|---|---|
| 2016/0026535 A1* | 1/2016 | Bhat | G06F 11/2048 714/19 |
| 2016/0054933 A1* | 2/2016 | Haghighi | G06F 12/0638 711/103 |
| 2017/0061568 A1* | 3/2017 | Metz | G06T 1/20 |
| 2019/0026028 A1 | 1/2019 | Chun et al. | |
| 2019/0235790 A1* | 8/2019 | Koo | G06F 21/78 |
| 2019/0303038 A1* | 10/2019 | Hubbard | G06F 3/0685 |
| 2020/0057561 A1 | 2/2020 | Lai et al. | |
| 2020/0151549 A1 | 5/2020 | Hwang et al. | |
| 2020/0219223 A1 | 7/2020 | Vembu et al. | |
| 2020/0278804 A1 | 9/2020 | Guim Bernat et al. | |
| 2021/0181957 A1 | 6/2021 | Diril et al. | |
| 2021/0200836 A1 | 7/2021 | Du et al. | |
| 2021/0201556 A1 | 7/2021 | Ray et al. | |
| 2022/0309731 A1 | 9/2022 | Ray et al. | |

\* cited by examiner

FIG. 6

| Work ID |
|---|
| Logical Device Information |
| Partition Information |
| Calculation ID |
| Calculation type |
| Calculation Size |
| Latency/Throughput Requirements |
| Associated Work ID |
| Core ID |

STORAGE SYSTEM AND METHOD TO PERFORM WORKLOAD ASSOCIATED WITH A HOST

CROSS-REFERENCE TO RELATED APPLICATIONS

This application claims priority under 35 U.S.C. § 119 to Korean Patent Application No. 10-2021-0128940 filed on Sep. 29, 2021 in the Korean Intellectual Property Office, the subject matter of which is hereby incorporated by reference in their entireties.

BACKGROUND

Embodiments of the inventive concept relate to electronic devices, and more particularly to memory devices capable of improving processor operating speeds. Embodiments of the inventive concept also relate to operating methods for a memory device and electronic devices including same.

Processors in various electronic devices perform many functions and/or execute many tasks (hereafter generically, "operations") using one or more memory devices. In this regard, a memory device may operate as a largely passive device which is accessed and controlled in its operation by a processor. Thus, the performance of operations is dictated by the processor without regard by the memory device, and without before-the-fact or after-the-fact recognition by the memory device.

A memory device may be directly accessed by the processor, and may be connected to a bus within an electronic device. In this regard, a memory device connected to the bus may include a control device adapted to control communication between the memory device and the bus.

SUMMARY

Embodiments of the inventive concept provide memory devices better supporting the operation of a processor in response to operational information (e.g., workload information related to work performed by the processor. Embodiments of the inventive concept also provide improved operating methods for memory devices, as well as electronic devices including such memory devices.

In one embodiment, a memory device includes; a first memory of first type, a second memory of second type different from the first type, and a memory controller configured to receive an access request and workload information related to work of an external processor, process the access request using the workload information, and access at least one of the first memory and the second memory in response to the access request.

In another embodiment, an operating method for a memory device including a first memory of first type and a second memory of second type different from the first type may include; providing capacity information of the first memory and capacity information of the second memory to an external processor, receiving address allocation information of the first memory and address allocation information of the second memory from the external processor, receiving access requests for at least one of the first memory and the second memory from the external processor, receiving workload information for work of the external processor associated with the access requests, and processing the access requests in response to the workload information.

In another embodiment, an electronic device may include; processors, memory devices, and a switch configured to connect the processors and the memory devices. At least one of the memory devices may include; a first memory of first type, a second memory different of second type different from the first type, and a memory controller configured to receive access requests from at least one of the processors through the switch, receive workload information from at least one of the processors, process the access requests in response to the workload information, and access at least one of the first memory and the second memory in response to access requests, wherein the memory controller outputs latency/busy information for at least one of the processors, and at least one of the processors performs scheduling of work in response to the latency/busy information.

BRIEF DESCRIPTION OF THE DRAWINGS

Advantages and features, as well as the making and use of the inventive concept, will become more apparent upon consideration of the following detailed description together with the accompanying drawings, in which:

FIG. 6 is a conceptual list illustrating examples of workload information;

DETAILED DESCRIPTION

The inventive concept will be described hereafter in the context of certain illustrated embodiments. Throughout the written description and drawings, like or similar numbers and labels are used to denote like or similar elements, components, features and/or method steps. Hereafter, the term "and/or" should be interpreted as including any one of listed items related to use of the term or any combination of same.

Figure 1:
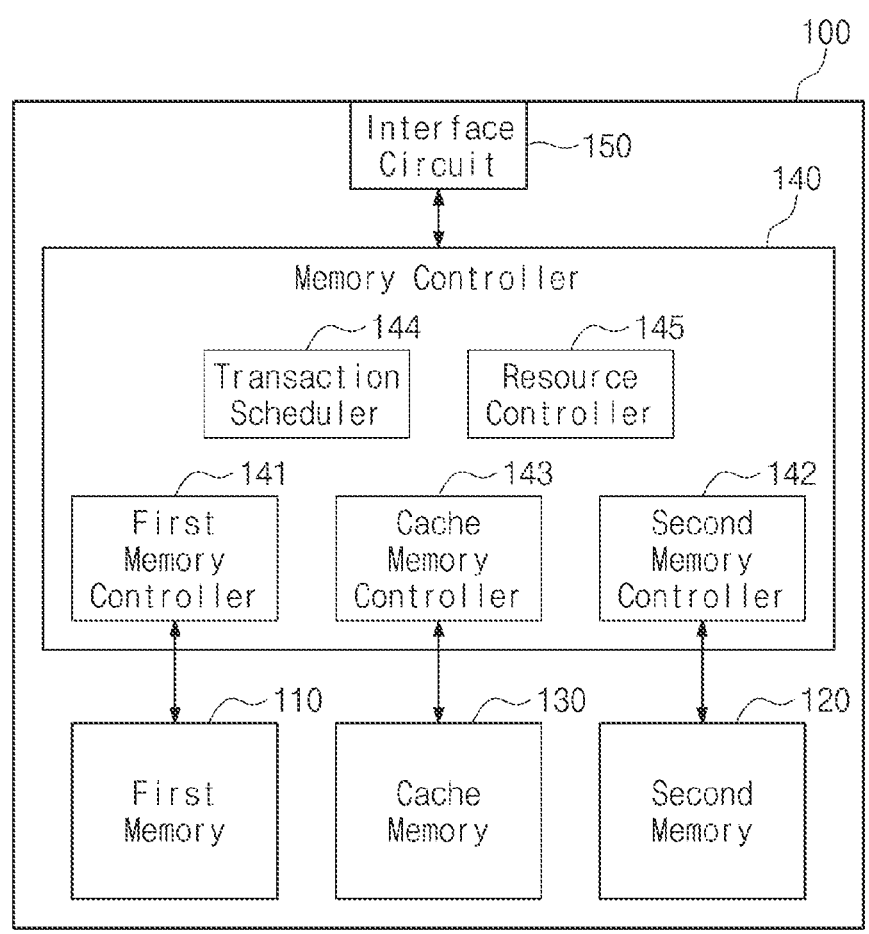
FIG. 1 is a block diagram illustrating a memory device according to embodiments of the inventive concept.

FIG. 1 is a block diagram illustrating a memory device 100 according to embodiments of the inventive concept. Referring to FIG. 1, the memory device 100 may generally include a first memory 110, a second memory 120, a cache memory 130, a memory controller 140, and an interface circuit 150.

The first memory 110 may be implemented using one or more random access memories (RAM), such as a static RAM (SRAM), a dynamic RAM (DRAM), a phase-change RAM (PRAM), a magnetic RAM (MRAM), a resistive RAM (RRAM), and/or a ferroelectric RAM. The second memory 120 may be implemented using one or more nonvolatile memories, such as a flash memory, a PRAM, a MRAM, a RRAM, and/or a ferroelectric RAM.

Thus, in some embodiments, the first memory 110 may be implemented as a first type memory and the second memory 120 may be implemented as a second type memory having different performance characteristics that the first type memory. For example, the first memory 110 may be a high-speed, low-capacity memory, while the second memory 120 may be a low-speed, high-capacity memory. That is, the memory device 100 may include heterogeneous memories.

The cache memory 130 may be used as a cache memory or a buffer memory (e.g., in relation to the operation of at least the second memory 120). Alternately, the cache memory 130 may be used to store metadata (e.g., a flash translation layer (FTL) and/or mapping table(s)) used to manage the second memory 120. In some embodiments wherein the first memory 110 and the cache memory 130 are implemented with homogeneous memories, the first memory 110 and the cache memory 130 may be implemented using a single memory. In this regard, a first portion (e.g., a designated or partitioned memory space) of the single memory may be used as the first memory 110, and the remaining second portion may be used as the cache memory 130.

The memory controller 140 may receive access requests from an external processor through the interface circuit 150. For example, the interface circuit 150 may be implemented according to technical standards readily available to those skilled in the art and associated with the Compute eXpress Link (CXL) or Peripheral Component Interconnect express (PCIe). In this regard, the memory device 100 may communicate with a processor using a channel configured as a compute express link, or channel configured in a manner compatible with the CXL technical standards.

In some embodiments, the memory controller 140 may include a first memory controller 141, a second memory controller 142, a cache memory controller 143, a transaction scheduler 144, and a resource controller 145.

The first memory controller 141 may control the first memory 110. The first memory controller 141 may generate an internal access request for the first memory 110 in response to (or based on) an access request received together with an address from the external processor. Thus, when a received address (e.g., a virtual address or a logical address) corresponding to the first memory 110 is received from the external processor through the interface circuit 150, the first memory controller 141 may map the received address onto a corresponding physical address of the first memory 110 (e.g.,) using various mapping tables.

Further in this regard, the first memory controller 141 may include a (first) queue in which the first memory controller 141 may store the internal access request and the mapped address or a pointer indicating the internal access request and the mapping address. The first memory controller 141 may send an internal access request and a mapped address, which correspond to an issue sequence, from among internal access requests and mapped address stored in the queue to the first memory 110. Thus, the first memory controller 141 may access the first memory 110 by sending a sequence of internal access requests and corresponding mapped addresses to the first memory 110.

The second memory controller 142 may control the second memory 120. Here, the second memory controller 142 may generate an internal access request for the second memory 120 in response to an access request received together with an address from the external processor through the interface circuit 150. When the received address (e.g., a virtual address or a logical address) corresponding to the second memory 120 is received from the external processor, the second memory controller 142 may map the received address onto a corresponding physical address of the second memory 120.

The second memory controller 142 also includes a (second) queue in which the second memory controller 142 may store the internal access request and the mapped address or a pointer indicating the internal access request and the mapping address. The second memory controller 142 may perform various background operations for controlling the second memory 120.

For example, assuming the use of a flash memory as the second memory 120, background operations may include a garbage collection operation, a read reclaim operation, a wear-leveling management operation, etc. The second memory controller 142 may generate internal access requests and addresses associated with the background operations and may store the internal access requests and the addresses (or pointers indicating the internal access requests and the addresses) in the queue.

The second memory controller 142 may send an internal access request and a corresponding mapped address according to an issue sequence from among the internal access requests and the mapped addresses stored in the queue to the second memory 120. Thus, the second memory controller 142 may access the second memory 120 by sending a sequence of internal access requests and corresponding mapped addresses to the second memory 120.

The cache memory controller 143 may be used to control the operation of the cache memory 130, and may operate in conjunction with the second memory controller 142. The cache memory controller 143 may allow the cache memory 130 to store metadata read from the second memory 120. The cache memory controller 143 may also allow the cache memory 130 to output metadata when the memory controller 140 requires.

When a write request directed to the second memory 120 is received from the external processor through the interface circuit 150, the cache memory controller 143 may allow the cache memory 130 to store write-requested write data until the write-requested write data are written to the second memory 120.

When a read request directed to the second memory 120 is received from the external processor through the interface circuit 150, the cache memory controller 143 may allow the cache memory 130 to store the read data read from the second memory 120. Further, in a case wherein read data is output (or provided) to the external processor, the cache memory controller 143 may allow the cache memory 130 to output the read data.

In some embodiments, the cache memory 130 may not be 'open' to the external processor, but instead may only be used within the memory device 100. Accordingly, the cache memory controller 143 may not operate to perform an address mapping operation.

The transaction scheduler 144 may schedule 'transactions' (e.g., memory access operations and background operations) between the external processor and the memory device 100. The transaction scheduler 144 may adjust sequences of access requests stored in the first queue of the first memory controller 141 and/or the second queue of the second memory controller 142. For example, the transaction scheduler 144 may receive operational information associated with various operations from the external processor, and adjust sequences of access requests stored in the first queue and/or the second queue in response to the operational information.

The resource controller 145 may manage resource(s) of the memory device 100. For example, the resource controller 145 may manage distribution (or allocation) of communications bandwidth (e.g., throughput capabilities) through which the memory device 100 communicates with the external processor. Alternately or additionally, the resource controller 145 may manage power of the memory device 100. For example, the resource controller 145 may receive various management information from the external processor, and manage bandwidth and/or power in response to the received management information.

Figure 2:
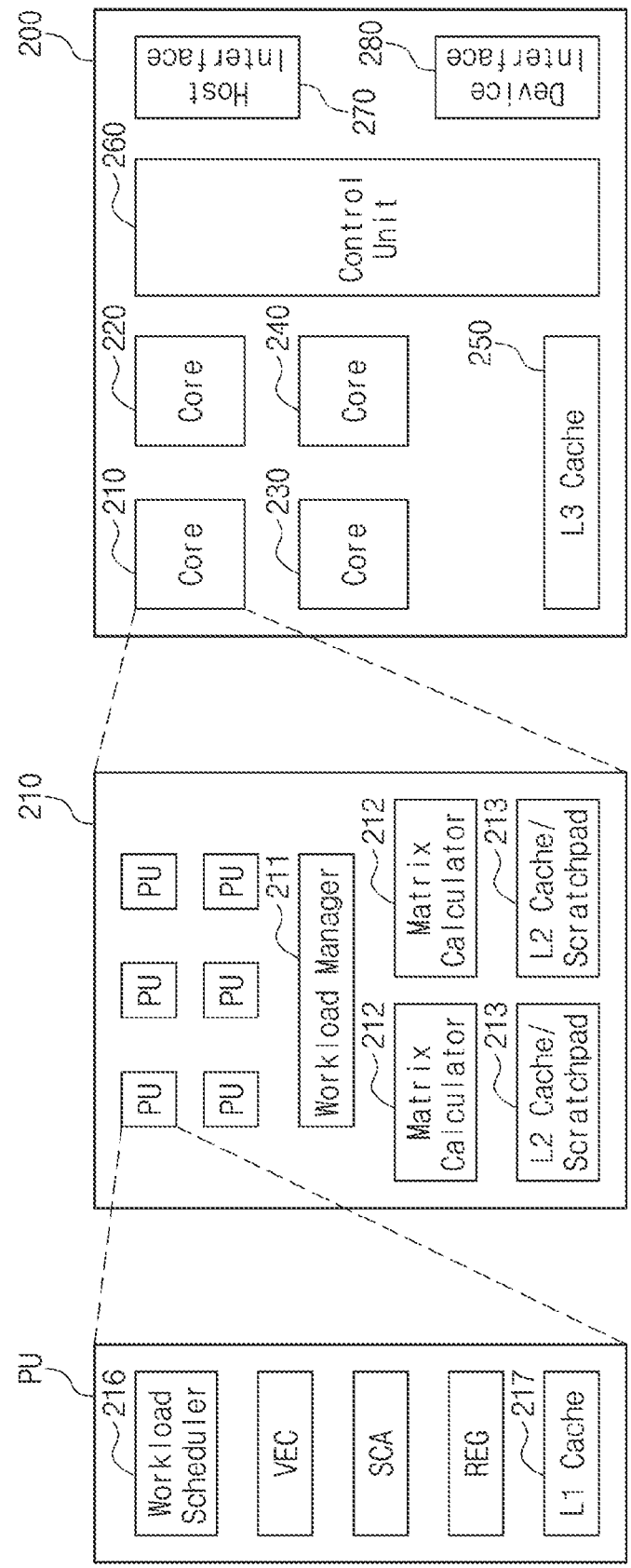
FIG. 2 is a block diagram illustrating a processor according to embodiments of the inventive concept.

FIG. 2 is a block diagram illustrating a processor 200 according to embodiments of the inventive concept. Referring to FIGS. 1 and 2, the processor 200 may be one of various processors types, including for example, a Central Processing Unit (CPU), a Neural Processing Unit (NPU), a Graphic Processing Unit (GPU), an Application Processor (AP), an Neuromorphic Processor (NP), an Field Programmable Gate Array (FPGA), an Application Specific Integrated Circuit (ASIC), and a Complex Programmable Logic Device (CPLD).

The processor 200 may include a first core 210, a second core 220, a third core 230, a fourth core 240, a third level cache (L3 cache) 250, a control unit 260, a host interface 270, and a device interface 280.

The first core 210, the second core 220, the third core 230, and/or the fourth core 240 may be homogeneous or heterogeneous cores. The first core 210, the second core 220, the third core 230, and the fourth core 240 may perform work independently or in cooperation with each other.

The third level cache 250 may store data that are required by the first core 210, the second core 220, the third core 230, and/or the fourth core 240. When a cache miss occurs in the third level cache 250, required data may be loaded from the memory device 100 to the third level cache 250.

The control unit 260 may distribute various 'work' among the first core 210, the second core 220, the third core 230, and/or the fourth core 240. In this regard, the term "work" may be used to denote various instructions, functions, tasks, processing threads, etc., associated with operations performed in relation the memory device 100 and/or processor 200. Hence, the control unit 260 may transfer workload information (e.g., information regarding the generation, nature and/or management of work) to various logic and/or memory devices. Further, the workload information may be used in relation to (e.g.,) one or more of the first core 210, the second core 220, the third core 230, and/or the fourth core 240 to establish (or "set") one or more resource partitions within the memory device 100. Accordingly, workload information may be communicated from the processor 200 to the memory device 100 through the device interface 280.

The host interface 270 may provide a channel through which the processor 200 may communicates with a main processor (e.g., a CPU or AP core). For example, in a multi-processor environment and assuming that the processor 200 is implemented together with a main processor (i.e., CPU or AP core), the host interface 270 may provide channel(s) between the processor 200, the main processor, and another processor (e.g., e.g., a CPU or AP core). Alternately, assuming that the processor 200 is implemented within a main processor, the host interface 270 may be omitted.

Further in this regard, the device interface 280 may provide communication channel(s) between the processor 200 and various devices operating under control of the processor 200. For example, the device interface 280 may provide a communication channel with the memory device 100.

It should be noted here that the illustrated embodiment of FIG. 2 assumes that use of the processor 200 including four (4) cores. However, those skilled in the art will recognize that this is an arbitrarily selected number of cores and other embodiments may use a different number of cores.

Referring again to FIG. 2, the first core 210 may include a number of processing units PU, a workload manager 211, matrix calculators 212, and second level caches (L2 cache) and/or scratchpad memories 213.

Each of the processing units PU may perform work (e.g., a task or a thread). When work requires data, each of the processing units PU may respectively request the data from the second level caches/scratchpad memories 213.

The workload manager 211 may manage the work (e.g., multiple tasks or processing threads) of the processing units PU. Accordingly, the workload manager 211 may allocate work among the processing units PU and/or schedule the allocated work. The workload manager 211 may also manage work performed by the matrix calculators 212.

Here, the matrix calculators 212 may perform various General Matrix to Matrix Multiplication (GEMM) operations, for example. The second level caches/scratchpad memories 213 may store data used by the processing units PU and/or the matrix calculators 212. When a cache miss occurs in the second level caches/scratchpad memories 213, the corresponding (or required) data may be loaded from the third level cache 250 to the second level caches/scratchpad memories 213.

Each of the processing units PU may include a workload scheduler 216, a vector calculator VEC, a scalar calculator SCA, a register REG, and a first level cache (L1 Cache) 217.

The workload scheduler 216 may manage the various work allocated to the vector calculator VEC and the scalar calculator SCA. The workload scheduler 216 may allocate work among the vector calculator VEC and the scalar calculator SCA and/or schedule the allocated work.

The vector calculator VEC may perform calculation of single instruction multiple data (SIMD). The scalar calculator SCA may perform scalar calculation. The register REG may store temporary data that are generated while the vector calculator VEC and/or the scalar calculator SCA performs an operation.

The first level cache 217 may store data necessary to the work being performed by the vector calculator VEC and/or the scalar calculator SCA. When a cache miss occurs in the first level cache 217, required data may be loaded from the second level caches/scratchpad memories 213 to the first level cache 217.

When data necessary to the operation of the processing units PU and/or the matrix calculators 212 are absent from the first level cache 217, the second level caches/scratchpad memories 213, and the third level cache 250, the processing units PU and/or the matrix calculators 212 may request the required data from the memory device 100 (e.g., through an access request).

Alternately, data processed by the processing units PU and/or the matrix calculators 212 may be backed up to the memory device 100 through the first level cache 217, the second level caches/scratchpad memories 213, and the third level cache 250.

Here, an operation unit of the vector calculator VEC may be greater than an operation unit of the scalar calculator SCA. An operation unit of the matrix calculators 212 may be greater than an operation unit of the vector calculator VEC. That is, the size (or quantity) of data accessed (e.g., read from or written to) with respect to the memory device 100 may vary according to the identify of the device generating the access request within the memory device 100 (e.g., whether the data request originates from the scalar calculator SCA, the vector calculator VEC, or the matrix calculators 212).

Further, data accessed within the memory device 100 will be performed on a unit size basis corresponding to the capacity of a cache line associated with the third level cache 250. That is, regardless of the device originating the data access within the memory device 100, the memory device 100 may response to the data access according to unit size corresponding to the capacity of the cache line of the third level cache 250. Accordingly, the memory device 100 may very well fail to accurately predict the capacity necessary to response to a data access in the absence of an access request accurately specifying same.

Thus, when an access request associated with the memory device 100 is generated, the processing units PU and/or the matrix calculators 212 according to embodiments of the inventive concept may provide the memory device 100 with workload information accurately specifying the data access requirements of the processing units PU and/or the matrix calculators 212. In this manner, the memory device 100 may faithfully identify and/or predict features associated with access requests based on the workload information. And further in this manner, the memory device 100 may support (e.g., accelerate) the operation of the processor 200 in relation to work.

Figure 3:
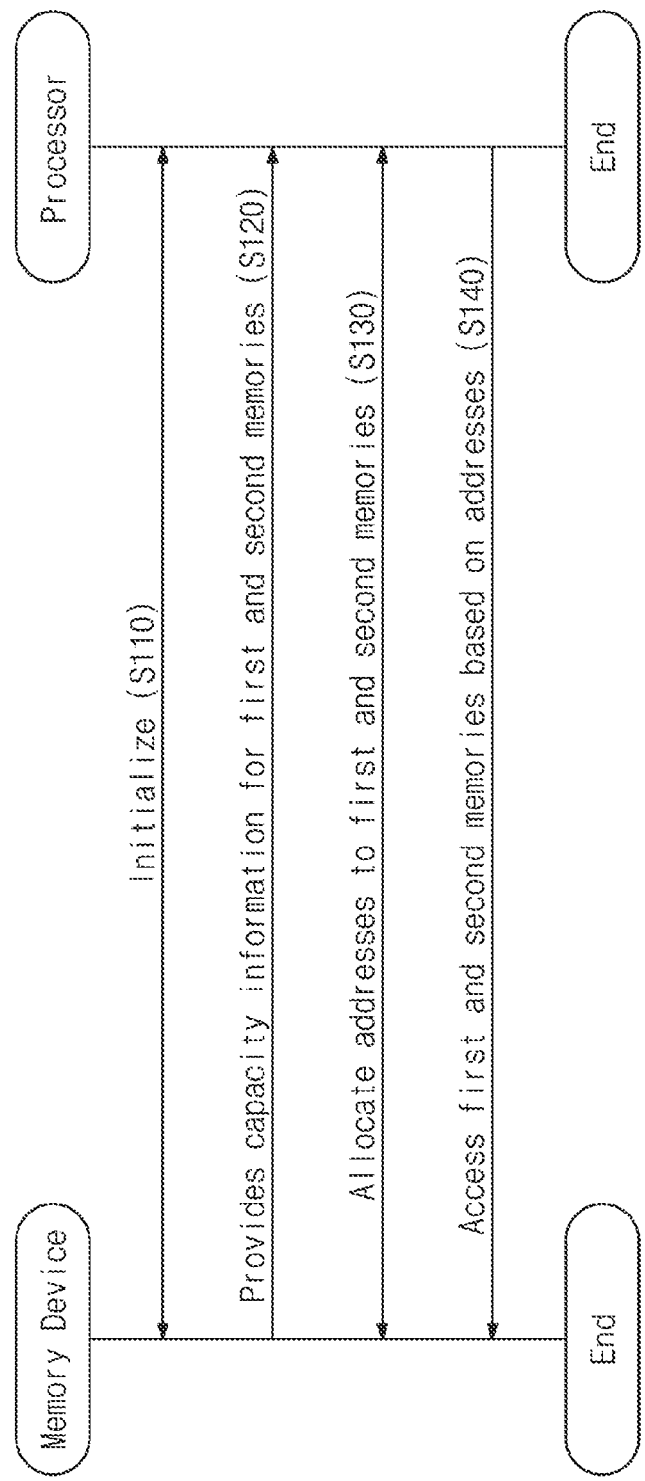
FIG. 3 is a flow diagram illustrating an operating method for a memory device and a processor according to embodiments of the inventive concept.

FIG. 3 is a flow diagram illustrating an operating method for the memory device 100 and the processor 200 of FIGS. 1 and 2. Referring to FIGS. 1, 2, and 3, the memory device 100 and the processor 200 may perform an initialization routine (S110). In this regard, the initialization routine may include various training operation(s) during which the memory device 100 and the processor 200 may align the timings of input signals and output signals.

Following completion of the initialization routine, the memory device 100 may provide the processor 200 with capacity information for the first memory 110 and the second memory 120 (S120). For example, the memory controller 140 may provide the processor 200 with information regarding the capacity of the first memory 110 and the capacities of one or more portion(s) of the second memory 120.

The processor 200 may then allocate addresses to the first memory 110 and the second memory 120 (S130). For example, the processor 200 may allocate first virtual addresses (or logical addresses) to the first memory 110 and second virtual addresses (or logical addresses) to at least a portion of the second memory 120.

The processor 200 may then access the first memory 110 and/or the second memory 120 in relation to the first virtual addresses and/or the second virtual addresses (S140). For example, the processor 200 may access the first memory 110 in response to an access request including (or indicating) a first virtual address, and may access the second memory 120 in response to an access request including (or indicating) a second virtual address.

The access request by the processor 200 may be a read operation or a write operation directed to the memory device 100 and may be made (or issued) in relation to a unit size corresponding to a capacity of a cache line of the third level cache 250, wherein the capacity of the cache line of the third level cache 250 may vary depending on how the processor 200 is implemented or configured.

Figure 4:
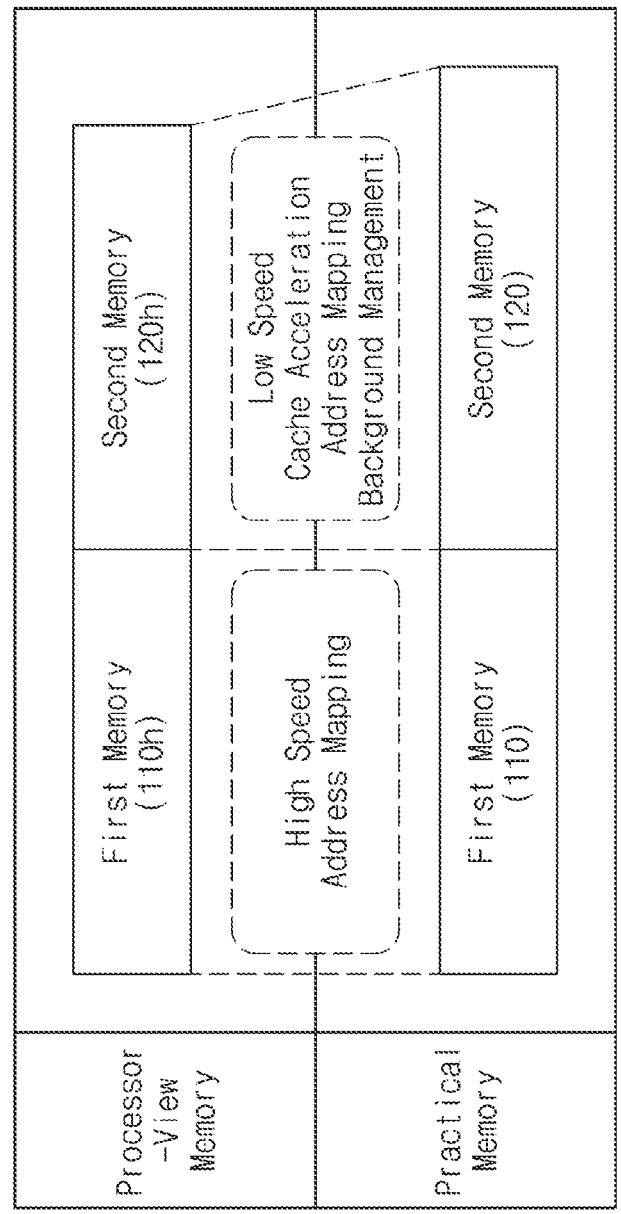
FIG. 4 is a conceptual diagram illustrating capacities of a first memory and a second memory in relation to capacities open to a processor.

FIG. 4 is a conceptual diagram illustrating actual capacities of the first memory 110 and the second memory 120, as well as capacities open to the processor 200.

Referring to FIGS. 1, 2, 3 and 4, the entirety of the capacity of the first memory 110 may be open to the processor 200, whereas only a first portion of the capacity of the second memory 120 may be open to the processor 200. The remaining (or second) portion of the capacity of the second memory 120 is not open to the processor 200, but may be used instead to store metadata necessary to management of the second memory 120. Further, a reserved area used to replace bad memory area(s) and/or an over-provision area used to improve performance of the second memory 120 may be designated.

The processor 200 may identify a storage space of the first memory 110, which is recognized by the first virtual addresses, as a high-speed area (e.g., according to a processor view 110$h$). The processor 200 may identify a storage space of the second memory 120, which is recognized by the second virtual addresses, as a low-speed area (e.g., according to a processor view 120$h$).

Alternately, the processor 200 may not separately recognize the storage space of the first memory 110 and the storage space of the second memory 120. That is, the processor 200 may recognize the storage space of the first memory 110 and the storage space of the second memory 120 as a storage space of the memory device 100 as a whole.

The storage space of the first memory 110 may be managed in relation to address mapping of the first memory controller 141. Access to the second memory 120 may be accelerated by the cache memory 130 and the cache memory controller 143. The storage space of the second memory 120 may be managed in relation to address mapping of the second memory controller 142. The second memory 120 may be managed by the background operations of the second memory controller 142.

Figure 5:
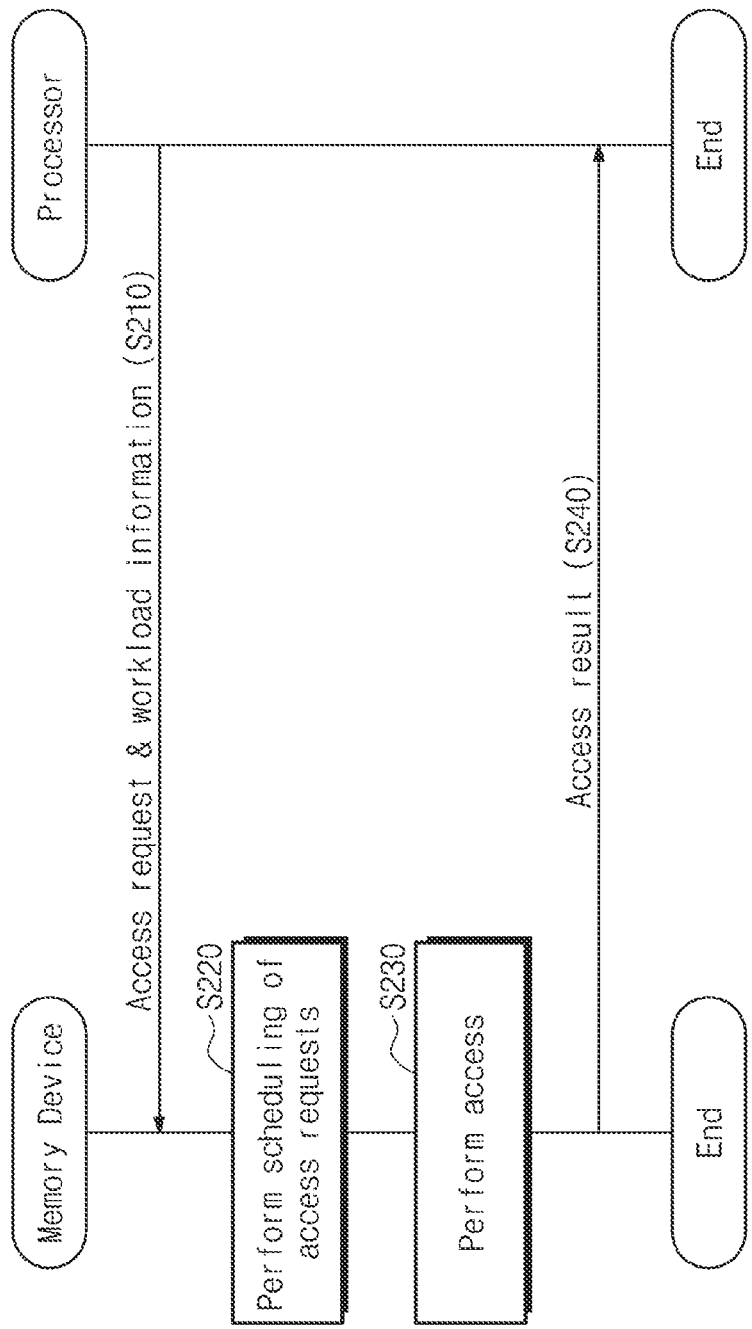
FIG. 5 is a flow diagram illustrating an operating method for a memory device and a processor according to embodiments of the inventive concept.

FIG. 5 is a flow diagram illustrating an operating method for the memory device 100 and the processor 200 according to embodiments of the inventive concept. Referring to FIGS. 1, 2, and 5, the processor 200 may send access requests and workload information to the memory device 100 (S210). Here, the access requests may include read requests and/or write requests, and the workload information may include information related to work that the processor 200 is performing in relation to the access requests. For example in this regard, the work of the processor 200 may include tasks and/or threads that the processor 200 is performing.

The memory device 100 may then process the access requests in response to (or based on) the workload information (S220). For example, the memory device 100 may schedule the access requests based on the workload information. The scheduling may include changing execution orders of the access requests. That is, in the memory device 100 of FIG. 1, the transaction scheduler 144 may schedule the access requests such that the time required for the work of the processor 200 to access the memory device 100 is reduced (e.g., accelerated).

The memory device 100 may then perform the scheduled access requests in response to the workload information (S230).

Then, the memory device 100 may send an access result (or response) to the processor 200 (S240). For example, in response to a write request, the memory device 100 may communicate a write completion indication or a write failure indication to the processor 200, and in response to a read request, the memory device 100 may communicate read data and/or a read completion indication or a read failure indication to the processor 200.

FIG. 6 is a conceptual diagram illustrating one example of workload information. Referring to FIGS. 1, 2, and 6, the workload information may include at least one of various information associated with work being performed by the processor 200, such as for example, a work identifier (ID), logical device information, partition information, a calculation ID, information of a calculation type, information of a calculation size, information of latency and/or throughput requirements, an associated work ID, and a core ID.

The work ID may identify work being performed (or executed) by a processing unit PU or a matrix calculator 212 generating an access request. The logical device information may include information about a logical device of the memory device 100 on which an access request is to be performed. The logical device information may include information about a utilization rate (or use frequency) of logical devices set to the memory device 100. Alternately, the logical device information may include information about whether a dominant access to the logical devices set to the memory device 100 is a random access or a sequential access.

The partition information may include information about a portion (or partition) of the memory device 100 on which an access request is to be performed. The partition information may include information about a utilization rate (or use frequency) of partitions set to the memory device 100. Alternately, the partition information may include information about whether a dominant access to the partitions set to the memory device 100 is a random access or a sequential access.

The calculation ID may identify calculation of work associated with an access request. For example, one work may include two or more calculations. One work may have one work ID, and two or more calculations may have two or more different calculation IDs. In some embodiments, two or more calculations that are continuously performed may have the same calculation ID.

The information of a calculation type may indicate a type of a calculation of work associated with an access request. For example, a type of a calculation may include scalar calculation, vector calculation, matrix calculation, or the like. The calculation type may be in the form of a combination of two or more calculations, which are continuously performed and have the same calculation ID, from among various calculations such as scalar calculation, vector calculation, and matrix calculation. For example, the calculation type may include scalar-vector calculation, vector-matrix calculation, or the like.

The information of a calculation size may indicate a size of a calculation of work associated with an access request. For example, the calculation size information may indicate a total of size (e.g., capacity) of data to be accessed to the memory device 100 by the calculation(s) having the same calculation ID.

The latency/throughput requirements may indicate a quality of service that the processing units PU or the matrix calculators 212 requires with respect to each access request.

The associated work ID may identify work that is performed with regard to work associated with an access request. The associated work ID may include an ID of an associated work to be performed by the same processing unit PU, an associated work to be performed by another processing unit PU, an associated work to be performed by the same matrix calculator 212, and an associated work to be performed by another matrix calculator 212. In the case where execution of one work may cause execution of another work, execution of one work may require execution of another work, or one work and another work are defined to be performed together (or in parallel), the one work and the another work may be associated with each other.

The core ID may identify a core associated with an access request.

The workload information types listed in FIG. 6 are just ready examples, and workload information according to embodiments of the inventive concept are not limited thereto.

Figure 7:
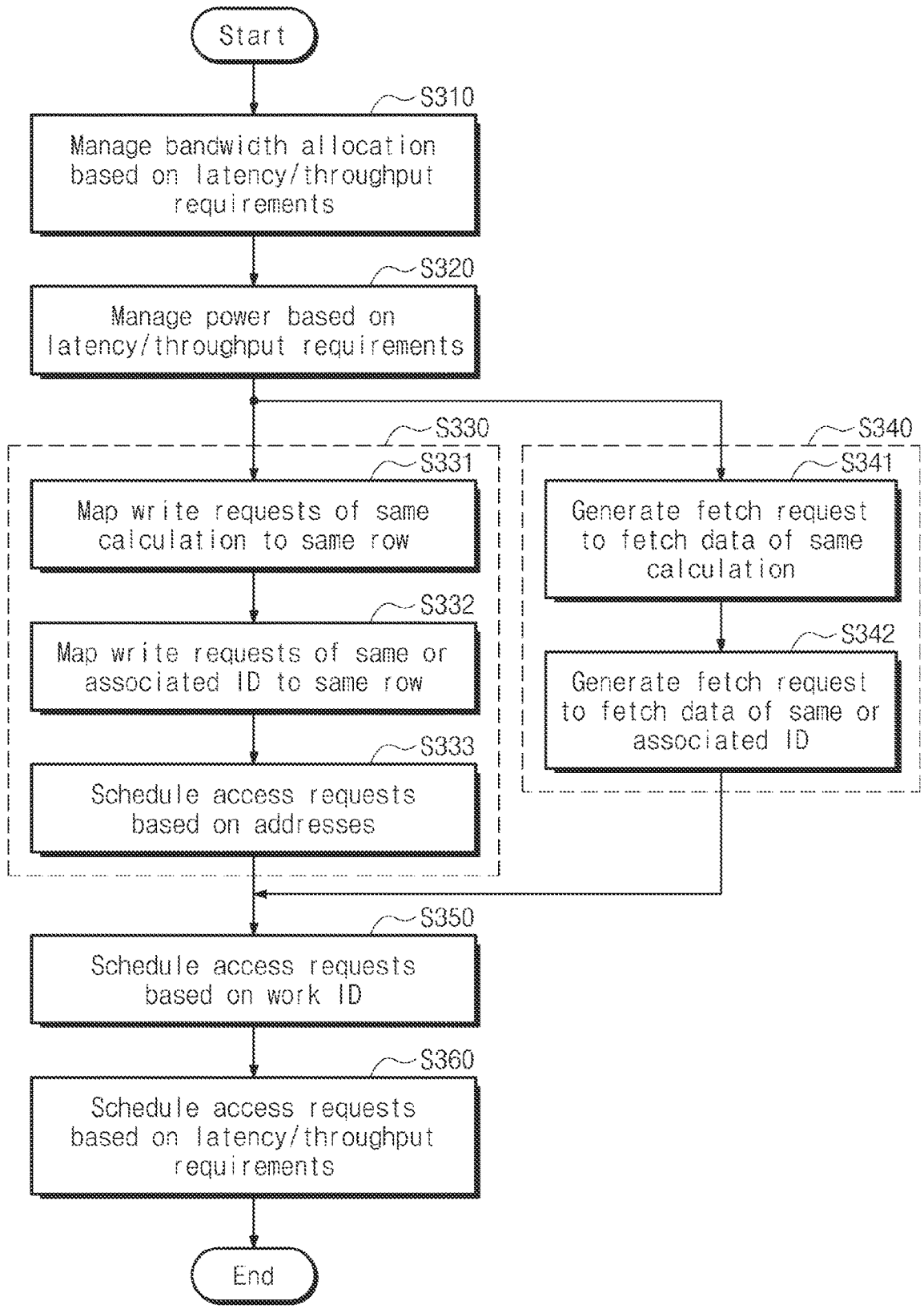
FIG. 7 is a flowchart illustrating an operating method for a memory device according to embodiments of the inventive concept.
Figure 8:
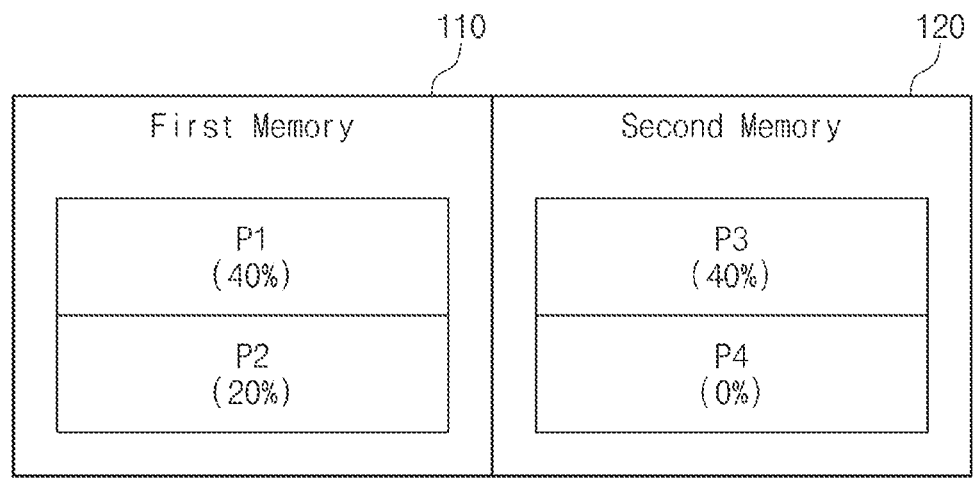
FIG. 8 is a conceptual diagram illustrating bandwidth management by a memory controller of first and second memories.

FIG. 7 is a flowchart illustrating an operating method for the memory device 100 according to embodiments of the inventive concept. Referring to FIGS. 1 and 7, the memory controller 140 may manage bandwidth allocation in response to partition information and/or logical device information (S310). One example in which the memory controller 140 manages bandwidths of partitions of the first memory 110 and the second memory 120 is illustrated in FIG. 8.

Referring to FIGS. 1, 2, 6, and 8, the storage space of the first memory 110 may be divided into a first partition P1 and a second partition P2. The storage space of the second memory 120 may be divided into a third partition P3 and a fourth partition P4. In some embodiments, in the case where the processor 200 does not designate a position of a partition to the first memory 110 or the second memory 120, the memory controller 140 may allocate, to the first memory 110, a partition that is stated in the partition information as a random access dominantly occurs. The memory controller 140 may allocate, to the second memory 120, a partition that is stated in the partition information as a sequential access dominantly occurs.

The partition information may indicate that each of access frequencies of the first partition P1 and the third partition P3 is a first frequency, an access frequency of the second partition P2 is a second frequency smaller than the first frequency, and an access frequency of the fourth partition P4 is a third frequency smaller than the second frequency. The third frequency may indicate that an access does not occur substantially.

The memory controller 140 may allocate 40% of the bandwidth to the first partition P1 of the first memory 110, may allocate 40% of the bandwidth to the third partition P3 of the second memory 120, may allocate 20% of the bandwidth to the second partition P2 of the first memory 110, and may allocate 0% of the bandwidth to the fourth partition P4 of the first memory 110. For example, the allocation of the bandwidth may be performed by distributing a transfer rate or a transfer time.

The processor 200 may send workload information including the partition information to the memory device 100 together with an access request. For example, the processor 200 may send the partition information every access request, may send the partition information periodically while access requests are transferred, or may send the partition information together with an access request that occurs when needed.

As another example, regardless of an access request, the processor 200 may send the partition information to the memory device 100 periodically or requested. An approach to managing bandwidth of the memory device 100 in response to the partition information may be similarly applied to an approach of managing bandwidth of the memory device 100 in response to the logical device information. For example, in the case where the terms "first partition P1", "second partition P2", "third partition P3", and "fourth partition P4" are replaced with the terms "first logical device", "second logical device", "third logical device", and "fourth logical device", the description given with reference to FIG. 8 may correspond to the description associated with managing the bandwidth in response to the logical device information.

Figure 9:
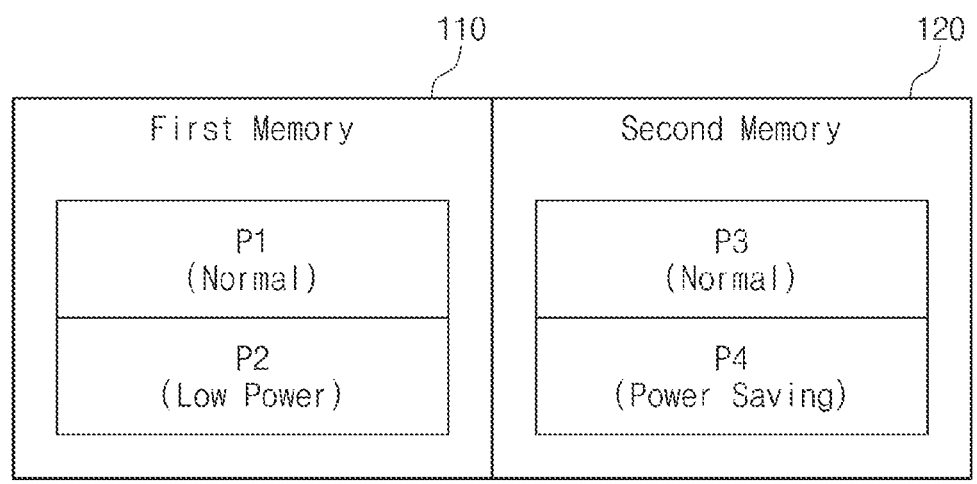
FIG. 9 is a conceptual diagram illustrating partition/power management by a memory controller of first and second memories.

Referring to FIGS. 1 and 7, the memory controller 140 may manage a power in response to the partition information and/or the logical device information (S320). One example in which the memory controller 140 manages powers of partitions of the first memory 110 and the second memory 120 is described in relation to FIG. 9.

Referring to FIGS. 1, 2, 6, and 9, the storage space of the first memory 110 may be divided into the first partition P1 and the second partition P2. The storage space of the second memory 120 may be divided into the third partition P3 and the fourth partition P4. In some embodiments, in the case where the processor 200 does not designate a position of a partition to the first memory 110 or the second memory 120, the memory controller 140 may allocate, to the first memory 110, a partition that is stated in the partition information as a random access dominantly occurs. The memory controller 140 may allocate, to the second memory 120, a partition that is stated in the partition information as a sequential access dominantly occurs.

The partition information may indicate that each of access frequencies of the first partition P1 and the third partition P3 is a first frequency, an access frequency of the second partition P2 is a second frequency smaller than the first frequency, and an access frequency of the fourth partition P4 is a third frequency smaller than the second frequency. The third frequency may indicate that an access does not occur substantially.

The memory controller 140 may set a power mode of the first partition P1 of the first memory 110 to a normal mode, may set a power mode of the third partition P3 of the second memory 120 to the normal mode, may set a power mode of the second partition P2 of the first memory 110 to a low-power mode, and may set a power mode of the fourth partition P4 of the second memory 120 to a power saving mode.

Power consumption in the low-power mode may be less than that in the normal mode, and an operating speed in the low-power mode may be lower than that in the normal mode (e.g., a latency in in the low-power mode may be greater than that in the normal mode, or a throughput in in the low-power mode may be smaller than that in the normal mode). Power consumption in the power saving mode may be the lowest, and an operating speed in the power saving mode may be the slowest (or an operation may not be performed in the power saving mode).

The processor 200 may send workload information including the partition information to the memory device 100 together with an access request. For example, the processor 200 may send the partition information every access request, may send the partition information periodically while access requests are transferred, or may send the partition information together with an access request that occurs when needed.

As another example, regardless of an access request, the processor 200 may send the partition information to the memory device 100 periodically or when needed. A method and a function of managing the power of the memory device 100 in response to the partition information may be identically applied to a method and a function of managing the power of the memory device 100 in response to the logical device information. For example, in the case where the terms "first partition P1", "second partition P2", "third partition P3", and "fourth partition P4" are replaced with the terms "first logical device", "second logical device", "third logical device", and "fourth logical device", the description given with reference to FIG. 9 may correspond to the description associated with managing the power in response to the logical device information.

Figure 10:
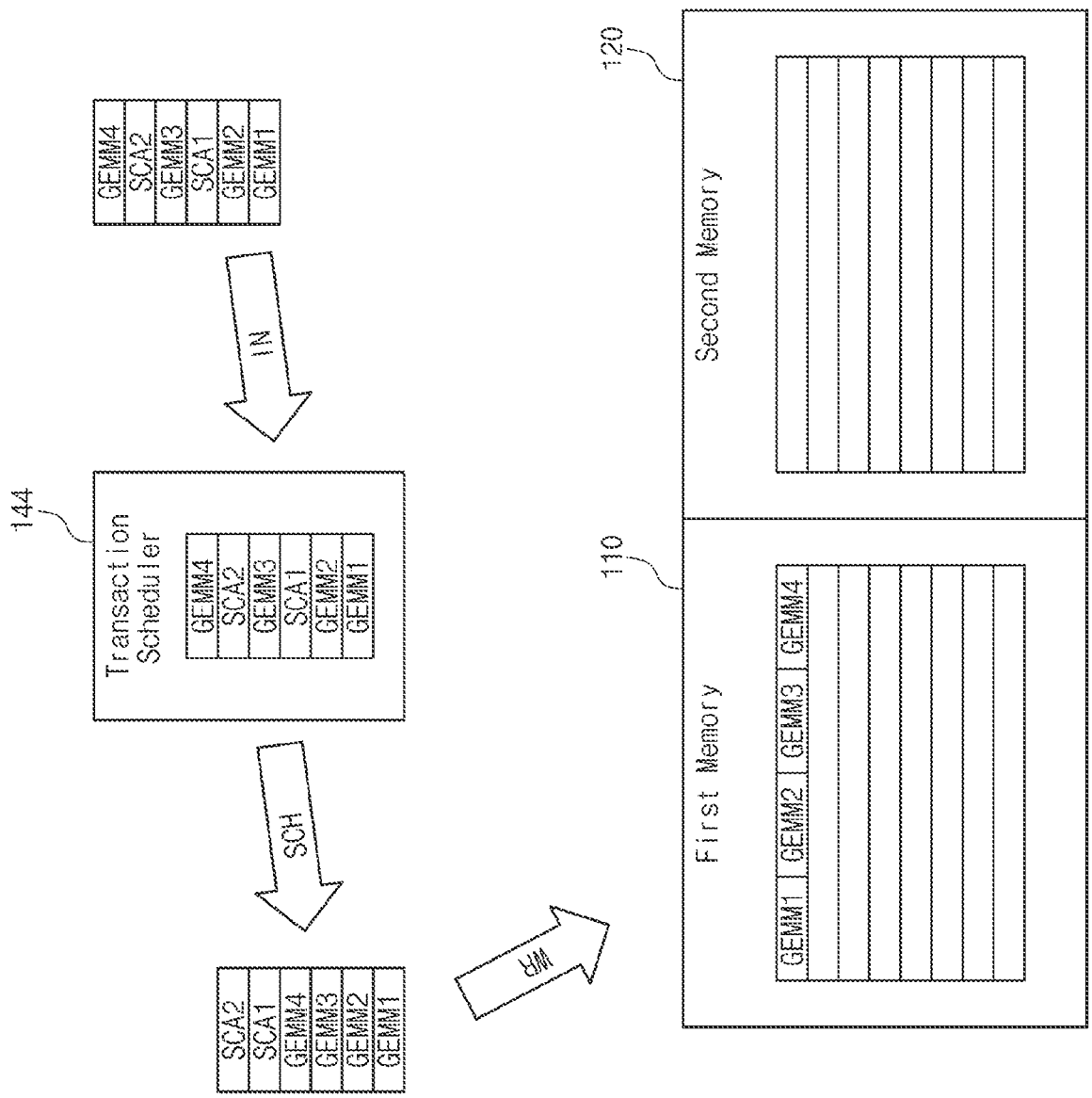
FIG. 10 is a conceptual diagram illustrating scheduling by a memory controller of write requests.

Referring to FIGS. 1 and 7, the memory controller 140 may schedule write requests of the access requests (S330). Here, the method step S330 may include steps S331, S332, and S333. One example in which the memory controller 140 schedules write requests is illustrated in the conceptual diagram of FIG. 10.

Referring to FIGS. 1, 2, 7, and 10, a write request corresponding to a first matrix multiplication operation GEMM1, a write request corresponding to a second matrix multiplication operation GEMM2, a write request corresponding to a first scalar operation SCA1, a write request corresponding to a third matrix multiplication operation GEMM3, a write request corresponding to a second scalar operation SCA2, and a write request corresponding to a fourth matrix multiplication operation GEMM4 may be sequentially received from the processor 200. (See, e.g., 'IN' in FIG. 10).

The memory controller 140 may map write requests for the same calculation (e.g., the same calculation ID) onto the same row of the first memory 110 or the second memory 120 (S331). The memory controller 140 may map write requests of the same ID (e.g., a work ID) or associated ID (e.g., an associated work ID) onto the same row of the first memory 110 or the second memory 120 (S332). The memory controller 140 may then schedule the access requests (e.g., write requests) in response to addresses (S333).

The write request corresponding to the first matrix multiplication operation GEMM1, the write request corresponding to the second matrix multiplication operation GEMM2, the write request corresponding to the third matrix multiplication operation GEMM3, and the write request corresponding to the fourth matrix multiplication operation GEMM4 may have the same calculation ID, may have the same work ID, or may have work IDs associated with each other. That is, the memory controller 140 may map the write request corresponding to the first matrix multiplication operation GEMM1, the write request corresponding to the second matrix multiplication operation GEMM2, the write request corresponding to the third matrix multiplication operation GEMM3, and the write request corresponding to the fourth matrix multiplication operation GEMM4 onto the same row of the first memory 110 or the second memory 120.

The write request corresponding to the first matrix multiplication operation GEMM1, the write request corresponding to the second matrix multiplication operation GEMM2, the write request corresponding to the third matrix multiplication operation GEMM3, and the write request corresponding to the fourth matrix multiplication operation GEMM4 may be mapped onto the same row address. When the memory controller 140 performs scheduling (see, e.g., 'SCH' in FIG. 10) in response to the addresses, the write request corresponding to the first matrix multiplication operation GEMM1, the write request corresponding to the second matrix multiplication operation GEMM2, the write request corresponding to the third matrix multiplication operation GEMM3, and the write request corresponding to the fourth matrix multiplication operation GEMM4 may be continuously written at the same row of the first memory 110 or the second memory 120. (See, e.g., 'WR' in FIG. 10).

The access requests having the same calculation ID, the same work ID, or associated work IDs may insensitively occur in terms of a time. When the access requests having the same calculation ID, the same work ID, or associated work IDs are performed continuously, for example, at the same time, the memory device 100 may complete the access requests through one write or read operation (or through a relatively small number of write or read operations). Accordingly, the processor 200 may perform work in a manner accelerated by the memory device 100.

In some embodiments, the memory controller 140 may manage, as meta information, a calculation ID, a work ID, and/or an associated work ID of data written in the first memory 110 or the second memory 120. The meta information may be backed up to the second memory 120 and/or the cache memory 130. The meta information may be referenced in the read operation.

In some embodiments, the memory controller 140 may map different kinds of write requests associated with each other onto one row of the first memory 110 or the second memory 120. When a size of data of a write request having the same calculation ID, the same work ID, or an associated work ID is larger than a size of one row of the first memory 110 or the second memory 120, the memory controller 140 may distribute and map the data of the write request having the same calculation ID, the same work ID, or an associated work ID onto two or more rows.

As another example, the memory controller 140 may schedule access requests having the same calculation ID, the same work ID, or associated work IDs in response to a capacity of one row of the first memory 110 or the second memory 120. For example, when data of the write request corresponding to the first matrix multiplication operation GEMM1 and data of the write request corresponding to the first scalar operation SCA1 correspond to a capacity of one row of the first memory 110 or the second memory 120 and/or the first matrix multiplication operation GEMM1 and the first scalar operation SCA1 are associated with each other, the memory controller 140 may map the write request corresponding to the first matrix multiplication operation GEMM1 and the write request corresponding to the first scalar operation SCA1 onto one row.

Figure 11:
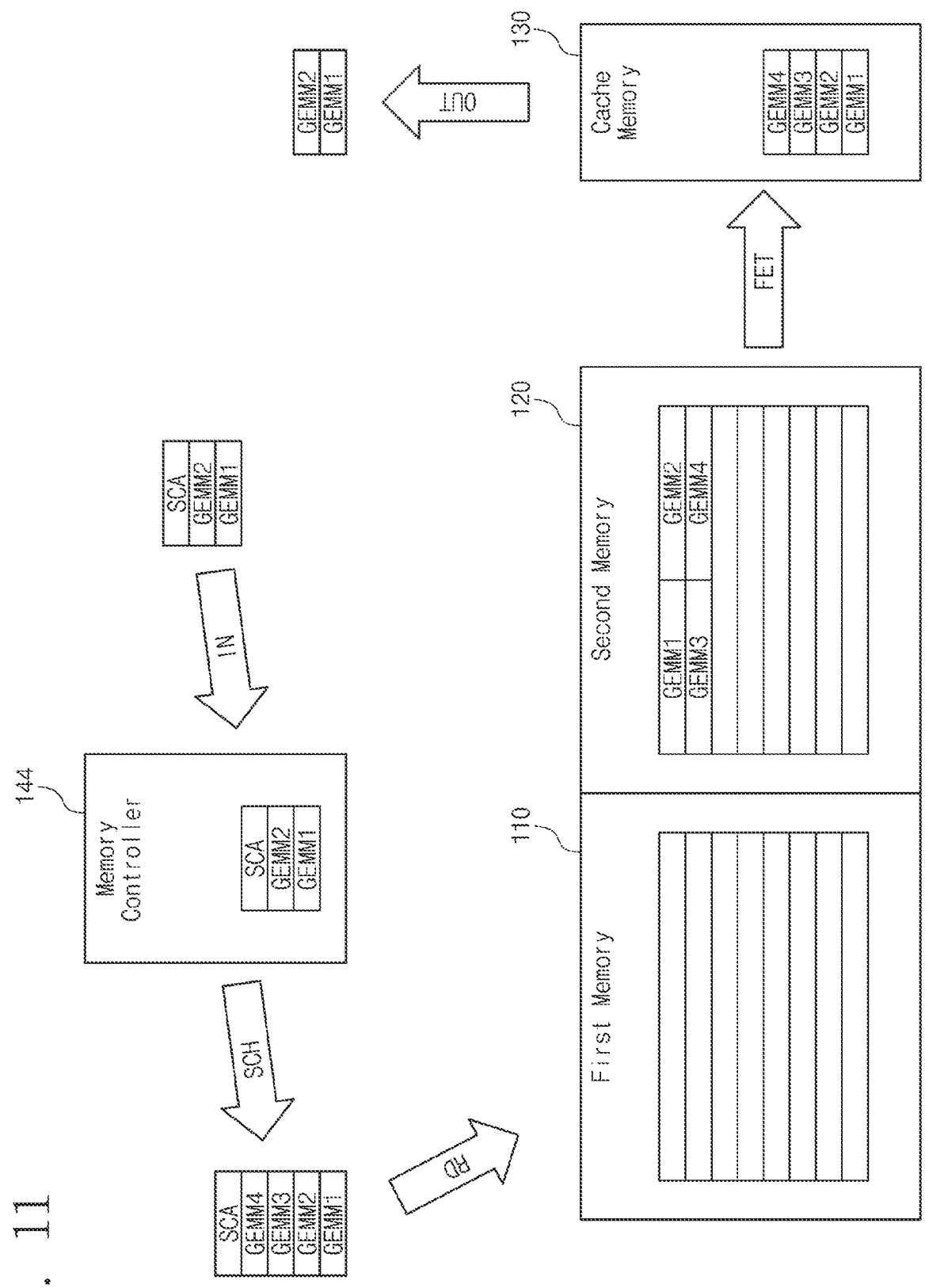
FIG. 11 is a conceptual diagram illustrating scheduling by a memory controller of read requests.

Referring to FIGS. 1 and 7, the memory controller 140 may schedule read requests of the access requests (S340). The method step S340 may include steps S341 and S342. One example in which the memory controller 140 schedules write requests is illustrated in the conceptual diagram of FIG. 11.

Referring to FIGS. 1, 2, 7, and 11, a read request corresponding to the first matrix multiplication operation GEMM1, a read request corresponding to the second matrix multiplication operation GEMM2, and a read request corresponding to a scalar operation SCA may be sequentially input from the processor 200. (See, e.g., 'IN' in FIG. 11).

The memory controller 140 may generate a fetch request for data corresponding to the same calculation (S341) (e.g., the same calculation ID) (e.g., with reference to the meta information). The memory controller 140 may generate the fetch request for data corresponding to the same ID (S342) (e.g., the same work ID) or an associated ID (e.g., an associated work ID) (e.g., with reference to the meta information).

The data corresponding to the first matrix multiplication operation GEMM1, the data corresponding to the second matrix multiplication operation GEMM2, the data corresponding to the third matrix multiplication operation GEMM3, and the data corresponding to the fourth matrix multiplication operation GEMM4 may have the same calculation ID, may have the same work ID, or may have work IDs associated with each other. That is, the memory controller 140 may perform scheduling of generating the fetch request corresponding to the third matrix multiplication operation GEMM3 and the fetch request corresponding to the fourth matrix multiplication operation GEMM4 in response to that the read request corresponding to the first matrix multiplication operation GEMM1 and/or the read request corresponding to the second matrix multiplication operation GEMM2 are received. (See. e.g., 'SCH' in FIG. 11).

The memory controller 140 may perform a read operation on the data corresponding to the first matrix multiplication operation GEMM1, the data corresponding to the second matrix multiplication operation GEMM2, the data corresponding to the third matrix multiplication operation GEMM3, and the data corresponding to the fourth matrix multiplication operation GEMM4. (See, e.g., 'RD' in the conceptual diagram of FIG. 11). The data corresponding to the first matrix multiplication operation GEMM1, the data corresponding to the second matrix multiplication operation GEMM2, the data corresponding to the third matrix multiplication operation GEMM3, and the data corresponding to the fourth matrix multiplication operation GEMM4 may be fetched to the cache memory 130. (See, e.g., 'FET' in FIG. 11).

The data corresponding to the first matrix multiplication operation GEMM1 and the data corresponding to the second matrix multiplication operation GEMM2 may be output to the processor 200. (See, e.g., 'OUT' in FIG. 11). The data corresponding to the third matrix multiplication operation GEMM3 and the data corresponding to the fourth matrix multiplication operation GEMM4 may be prefetched to the cache memory 130.

The access requests having the same calculation ID, the same work ID, or associated work IDs may insensitively occur in terms of a time. When a read request for a portion of data having the same calculation ID, the same work ID, or associated work IDs occurs, a read request for the remaining portion of the data may occur within a short time. The memory controller 140 may prefetch data expected to be requested within a short time to the cache memory 130. Accordingly, the processor 200 may perform work in a manner accelerated by the memory device 100.

Referring to FIGS. 1, 2, and 7, the memory controller 140 may schedule the access requests in response to a work ID (S350). For example, the memory controller 140 may schedule the access requests having the same work ID so as to have continuous orders. As another example, the memory controller 140 may schedule the access requests having the same work ID so as to have discontinuous orders.

When the access requests having the same work ID are scheduled to have continuous orders, a speed at which each work is processed in the processor 200 may be improved. When the access requests having the same work ID are scheduled to have discontinuous orders, two or more work may be processed in parallel in the processor 200. Scheduling according to a work ID may be variously applied depending on implementation.

The memory controller 140 may schedule the access requests in response to the latency/throughput requirements (S360). One example in which the memory controller 140 schedules access requests in response to the latency/throughput requirements is illustrated in the conceptual diagram of FIG. 12.

Referring to FIGS. 1, 2, 7, and 12, an access request that is input to the memory controller 140 may be received with a requirement latency. The memory controller 140 may count an elapsed latency after the access request is received. One latency may refer to a cycle in which one access request is processed.

A first access request AR1 may be received with a requirement latency RL of 3 and may have an elapsed latency EL of 1. A second access request AR2 may be received with the requirement latency RL of 4 and may have the elapsed latency EL of 1. A third access request AR3 having the requirement latency RL of 2 may be input from the processor 200 to the memory controller 140. (See, e.g., 'IN' in FIG. 12).

The remaining latency of the first access request AR1 may correspond to a difference between the requirement latency RL and the elapsed latency EL. The remaining latency of the first access request AR1 may be 2. The remaining latency of the second access request AR2 may be 3. Because the elapsed latency EL of the third access request AR3 newly input thereto is "0", the remaining latency of the third access request AR3 may be the same as the requirement latency RL, that is, 2.

The memory controller 140 may schedule the first access request AR1, the second access request AR2, and the third access request AR3 in response to the remaining latency. (See, e.g., 'SCH' in FIG. 12). The third access request AR3 whose remaining latency is 2 may be scheduled to be executed prior to the second access request AR2 whose remaining latency is 3.

Figure 12:
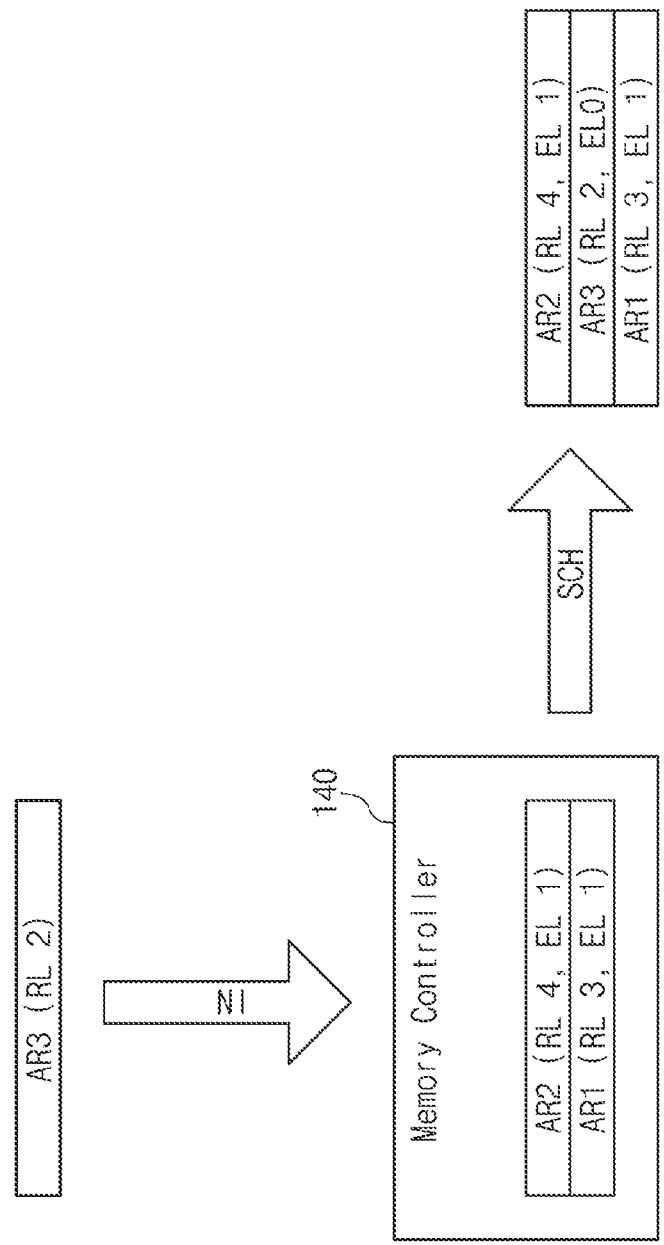
FIG. 12 is a conceptual diagram illustrating scheduling by a memory controller of access requests in response to a latency/throughput requirements.

One example in which scheduling is performed in response to a latency has been described in relation to FIG. 12. However, the memory device 100 may perform scheduling in response to a throughput, instead of a latency. The memory controller 140 may perform scheduling of access requests in response to a difference between a requirement throughput and an elapsed latency.

Various operations performed by the memory device 100 in response to the workload information have been described in relation to FIG. 7. However, operations performed by the memory device 100 in response to the workload information are not limited to only those described above.

Memory devices according to embodiments of the inventive concept may change the order in which the method steps of FIG. 7 are performed, may omit one or more of the method steps of FIG. 7 and/or may differently perform one or more of the steps of FIG. 7.

Figure 13:
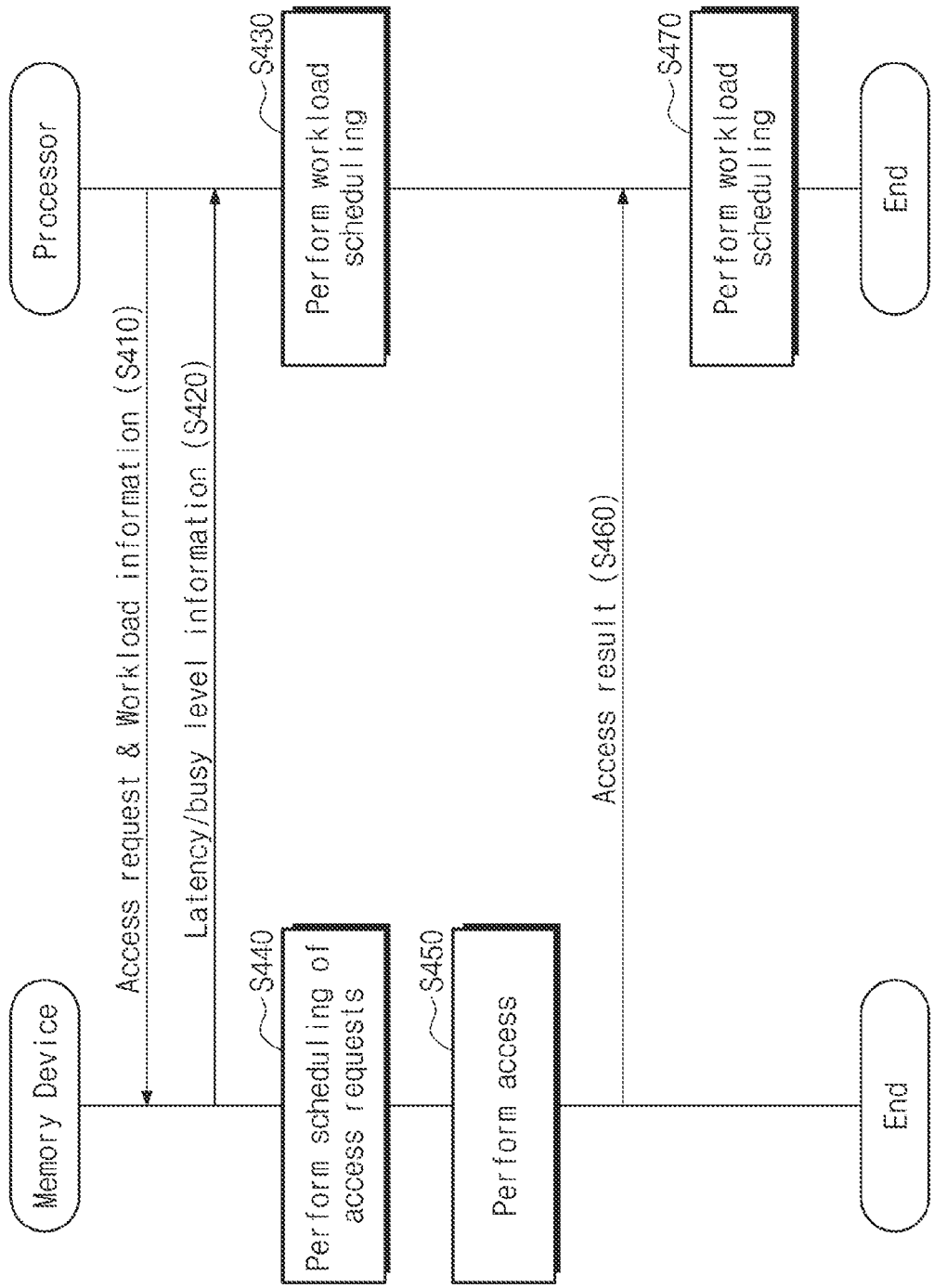
FIGS. 13 and 14 are respective flow diagrams illustrating operating methods for a memory device and a processor according to embodiments of the inventive concept.

FIG. 13 is a flow diagram illustrating an operating method for the memory device 100 and the processor 200 according to embodiments of the inventive concept. Referring to FIGS. 1, 2, and 13, the processor 200 may communicate access requests and workload information to the memory device 100 (S410).

In response to the received access requests, the memory device 100 may send latency level information and/or busy level information (hereafter singularly or collectively, "latency/busy information") to the processor 200. For example, whenever an access request is received, the memory device 100 may send latency/busy information related to the received access request to the processor 200. Alternately or additionally, the latency/busy information may be communicated to the processor as requested, whenever it materially changes, or periodically.

Here, latency level may be understood as an expected latency until access request (or access requests) will be processed. The latency level may be specifically expressed in terms of a particular number of command cycles, or generally expressed in terms of (e.g.,) high, middle and low levels. The busy level may indicate, generally or specifically, a number (or level) of access requests currently pending for execution in the memory device 100.

Referring to FIGS. 1, 2 and 13, the processor 200 may perform workload scheduling in response to the latency/busy information (S430). For example, in a case wherein the latency level of the memory device 100 is high or the busy level of the memory device 100 is high, a relatively long time may be required to process an access request. When the processing unit PU or the matrix calculator 212 generates an access request for the memory device 100, the processor 200 may perform scheduling such that other work is allocated to the processing unit PU or the matrix calculator 212.

The memory device 100 may then perform scheduling of the access requests (S440), and then the memory device 100 may perform the access requests (S450). The memory device 100 may then send a corresponding access result to the processor 200 (S460). Thereafter, the processor 200 may again perform workload scheduling (S470). When access to the memory device 100 is completed, the processor 200 may perform scheduling such that the corresponding processing unit PU or the corresponding matrix calculator 212 is returned to a previous work.

Figure 14:
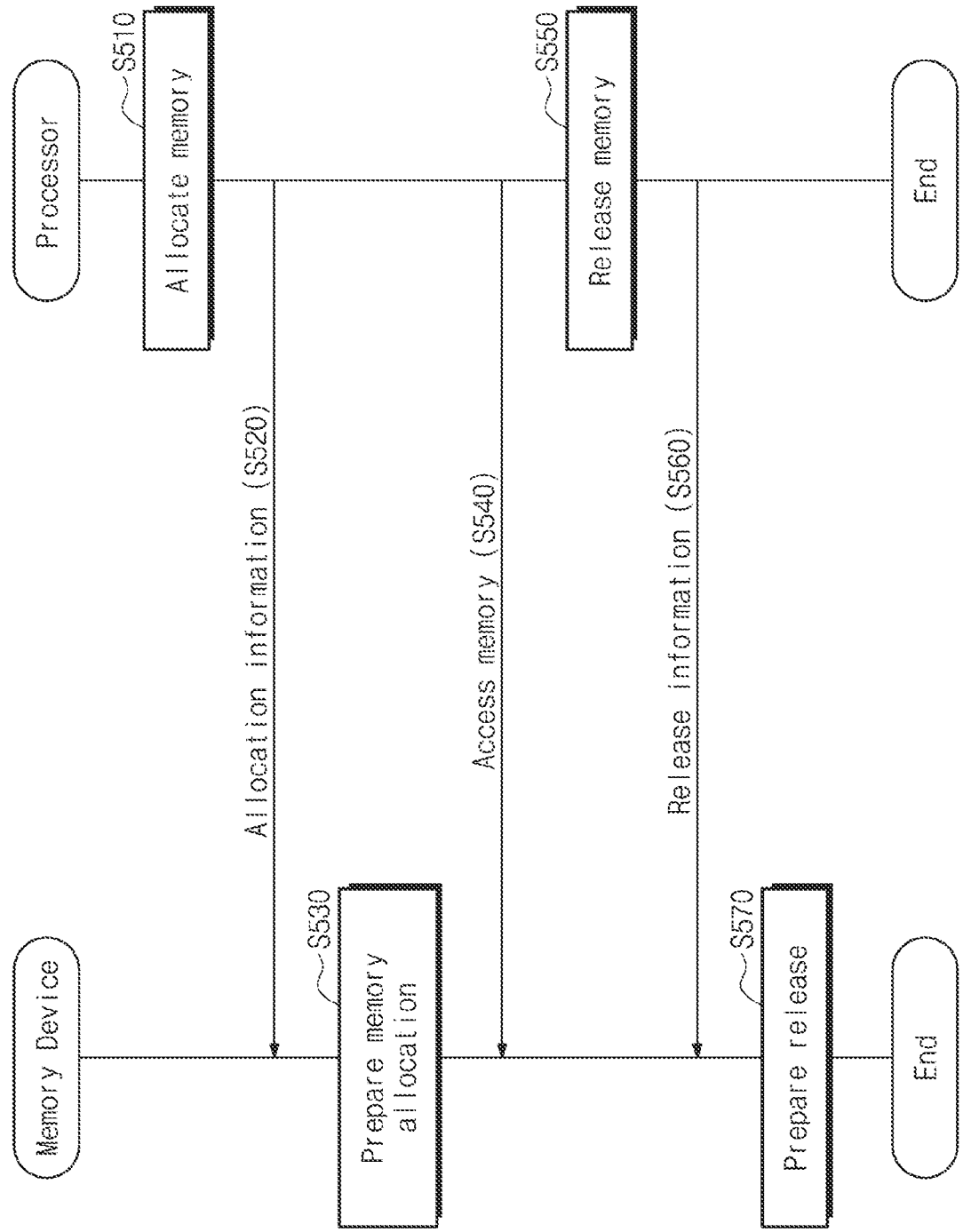

FIG. 14 is a flow diagram illustrating an operating method for the memory device 100 and the processor 200 according to embodiments of the inventive concept.

Referring to FIGS. 1, 2, and 14, the processor 200 may allocate a memory of the memory device 100 (S510). For example, the allocation may include determining that the processor 200 uses a specific storage space of the memory device 100.

The processor 200 may then send allocation information to the memory device 100 (S520), and the memory device 100 may prepare an appropriate memory allocation (S530). For example, the memory device 100 may secure sufficient storage space in view of the allocated memory by performing a garbage collection operation in the second memory 120.

Then, the processor 200 may access the allocated memory (S540). The processor 200 may release the allocation of memory (S550). For example, the allocation release may include determining that the processor 200 is no longer using the allocated memory. Accordingly, the processor 200 may send release information to the memory device 100 (S560), and the memory device 100 may prepare the release by invalidating data of the allocated memory of the second memory 120 (S570).

As described above, the processor 200 may send allocation and release information to the memory device 100, and the memory device 100 may manage the first memory 110 and/or the second memory 120 in response to the allocation and release information. In this manner, the memory device 100 may support work being performed by the processor 200.

Figure 15:
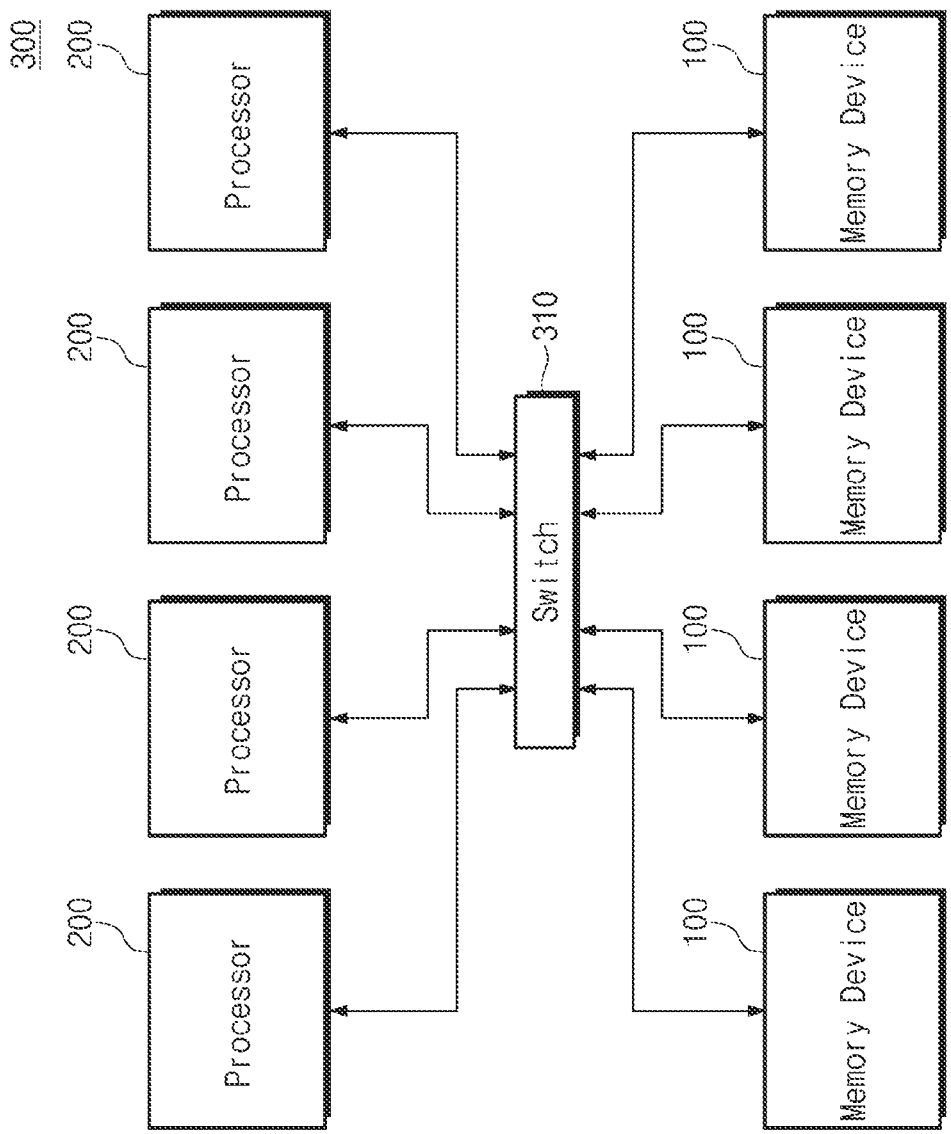
FIG. 15 is a block diagram illustrating an electronic device according to embodiments of the inventive concept.

FIG. 15 is a block diagram illustrating an electronic device 300 according to embodiments of the inventive concept. Referring to FIG. 15, the electronic device 300 may include memory devices 100, processors 200, and a switch 310.

In some embodiments, each of the memory devices 100 may be substantially similar to the memory device 100 of FIG. 1, and each of the processors 200 may be substantially similar to the processor 200 of FIG. 2. Here, the switch 310 may provide various channels between the memory devices 100 and the processors 200. In some embodiments, the switch 310 may be implemented as a CXL device.

In the context of the foregoing architecture, the processors 200 may variously send workload information to one or more memory devices 100. The memory devices 100 may then process access requests in response to the workload information. The memory devices 100 may provide the processors 200 with status information, for example, information of a busy level and/or a latency level. The processors 200 may schedule work in response to the status information of the memory devices 100.

In the illustrated embodiments, components according to embodiments of the inventive concept are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the inventive concept, a memory device may process access requests from a processor in response to workload information of work of the processor. Accordingly, a memory device supporting that the processor performs work, an operating method of the memory device, and an electronic device including the memory device are provided.

While the inventive concept has been described with reference to embodiments thereof, it will be apparent to those of ordinary skill in the art that various changes and modifications may be made thereto without departing from the spirit and scope of the inventive concept as set forth in the following claims.

What is claimed is:
1. A memory device comprising:
a first memory of a first type;
a second memory of a second type different from the first type; and
a memory controller configured to
receive a plurality of access requests and workload information related to work of a processor external to the memory device, wherein the plurality of access requests comprise a plurality of first access requests and a plurality of second access requests, wherein the workload information includes at least one calculation type identifier (ID),
schedule, using the at least one calculation type ID, the plurality of first access requests and the plurality of second access requests such that the plurality of first access requests are individually processed and the plurality of second access requests are continuously processed, process the plurality of access requests using the workload information, and
access at least one of the first memory and the second memory in response to the plurality of access requests.

2. The memory device of claim 1, wherein the workload information includes at least one work identifier (ID).

3. The memory device of claim 2, wherein the memory controller is further configured to schedule the plurality of access requests, such that access requests of the plurality of access requests respectively corresponding to the workload information and including the same work ID are continuously performed.

4. The memory device of claim 1, wherein the workload information further includes at least one associated work identifier (ID).

5. The memory device of claim 1, wherein the plurality of second access requests are write requests, and
the memory controller maps the second access requests onto one row of the first memory or one row of the second memory.

6. The memory device of claim 1, further comprising:
a cache memory associated with operation of the second memory,
wherein the memory controller is further configured to generate second read requests fetching data stored in the second memory to the cache memory using first read requests having a same calculation type and associated with the second memory among the plurality of access requests.

7. The memory device of claim 1, wherein the workload information includes at least one calculation size.

8. The memory device of claim 1, wherein the workload information includes at least one calculation identifier (ID).

9. The memory device of claim 1, wherein the workload information includes at least one latency/throughput requirement associated with the plurality of access requests.

10. The memory device of claim 9, wherein the memory controller is further configured to count elapsed latencies after the plurality of access requests are received.

11. The memory device of claim 10, wherein the memory controller is further configured to schedule the plurality of access requests using at least one of a newly input access request, the at least one latency/throughput requirement, and the elapsed latencies.

12. The memory device of claim 1, wherein the memory controller is further configured to receive logical device information from the processor and perform at least one of power management and bandwidth management using the logical device information.

13. The memory device of claim 1, wherein the memory controller is further configured to receive partition information from the processor and perform at least one of power management and bandwidth management using the partition information.

14. The memory device of claim 1, wherein the memory controller is further configured to output latency/busy information to the processor.

15. The memory device of claim 1, wherein the memory controller is further configured to receive memory allocation information and memory release information from the processor, and manage at least one of the first memory and the second memory using the memory allocation information and the memory release information.

16. An operating method for a memory device including a first memory of a first type and a second memory of a second type different from the first type, the method comprising:
provide capacity information of the first memory and capacity information of the second memory to a processor external to the memory device;
receiving address allocation information of the first memory and address allocation information of the second memory from the processor;
receiving a plurality of access requests for at least one of the first memory and the second memory from the processor;
receiving workload information for work of the processor associated with the plurality of access requests; and
processing the plurality of access requests using the workload information.

17. The operating method of claim 16, wherein the memory device communicates with the processor using a channel configured as compute express link channel.

18. An electronic device comprising:
processors, memory devices, and a switch configured to connect the processors and the memory devices,
wherein at least one of the memory devices includes: a first memory of a first type;
a second memory different of a second type different from the first type; and
a memory controller configured to
receive a plurality of access requests from at least one of the processors through the switch,
receive workload information from the at least one of the processors, wherein the workload information includes at least one latency/throughput requirement associated with the plurality of access requests,
process the plurality of access requests using the workload information, and
access at least one of the first memory and the second memory using the plurality of access requests,
wherein the memory controller outputs latency/busy information for at least one of the processors, and at least one of the processors performs scheduling of work using the latency/busy information, and
wherein the memory controller is further configured to count elapsed latencies after receipt of the plurality of access requests.

* * * * *